(12) United States Patent
Pritchard et al.

(10) Patent No.: US 6,957,905 B1
(45) Date of Patent: Oct. 25, 2005

(54) SOLID STATE LIGHT SOURCE

(75) Inventors: Donald V. Pritchard, Glenshaw, PA (US); William J. Magiske, Verona, PA (US)

(73) Assignee: LED Pipe, Inc., Glenshaw, PA (US)

( * ) Notice: Subject to any disclaimer, the term of this patent is extended or adjusted under 35 U.S.C. 154(b) by 176 days.

(21) Appl. No.: 10/263,922

(22) Filed: Oct. 3, 2002

Related U.S. Application Data

(60) Provisional application No. 60/326,802, filed on Oct. 3, 2001.

(51) Int. Cl.[7] .............................................. F21V 7/04
(52) U.S. Cl. ...................... 362/554; 362/555; 362/202; 362/158; 315/194
(58) Field of Search ................................ 362/202, 204, 362/231, 184, 267, 158, 554–556, 578; 315/194, 315/185 R

(56) References Cited

U.S. PATENT DOCUMENTS

| | | | | |
|---|---|---|---|---|
| 3,582,638 A | * | 6/1971 | Peters ......................... | 362/577 |
| 4,211,955 A | | 7/1980 | Ray | |
| 4,234,911 A | | 11/1980 | Faith | |
| 4,346,329 A | * | 8/1982 | Schmidt ...................... | 315/51 |
| 4,358,708 A | * | 11/1982 | Silva et al. ................... | 315/58 |
| 4,441,142 A | * | 4/1984 | Garofalo ...................... | 362/158 |
| 4,531,178 A | * | 7/1985 | Uke ............................ | 362/158 |
| 4,733,337 A | * | 3/1988 | Bieberstein ................. | 362/206 |
| 4,819,141 A | * | 4/1989 | Maglica et al. ............. | 362/207 |
| 5,580,147 A | * | 12/1996 | Salerno ....................... | 362/551 |
| 5,634,711 A | | 6/1997 | Kennedy et al. | |
| 5,746,495 A | * | 5/1998 | Klamm ....................... | 362/577 |
| 5,760,439 A | * | 6/1998 | Tanaka et al. .............. | 257/323 |
| 5,842,766 A | * | 12/1998 | Scharf, III .................. | 362/554 |
| 5,850,126 A | | 12/1998 | Kanbar | |
| 5,897,195 A | | 4/1999 | Chote | |
| 6,028,694 A | | 2/2000 | Schmidt | |
| 6,095,661 A | * | 8/2000 | Lebens et al. .............. | 362/184 |
| 6,132,072 A | * | 10/2000 | Turnbull et al. ............ | 362/494 |
| 6,168,288 B1 | | 1/2001 | St. Claire | |
| 6,177,954 B1 | | 1/2001 | Bouvier | |
| 6,200,134 B1 | * | 3/2001 | Kovac et al. ................ | 433/29 |
| 6,220,719 B1 | | 4/2001 | Vetorino et al. | |
| 6,220,722 B1 | | 4/2001 | Begemann | |
| 6,231,207 B1 | | 5/2001 | Kennedy et al. | |
| 6,234,645 B1 | | 5/2001 | Börner et al. | |
| 6,267,492 B1 | * | 7/2001 | Reid et al. .................. | 362/551 |
| 6,268,702 B1 | | 7/2001 | Fleck | |
| 6,276,822 B1 | | 8/2001 | Bedrosian et al. | |
| 6,283,613 B1 | | 9/2001 | Schaffer | |
| 6,290,382 B1 | | 9/2001 | Bourn et al. | |

(Continued)

*Primary Examiner*—Ali Alavi
(74) *Attorney, Agent, or Firm*—Blynn Shideler; Krisanne Shideler; BLK Law Group

(57) ABSTRACT

A light source includes a housing, an LED array of individual LED elements mounted in the housing, and a controller mounted in the housing and coupled to the LED array. The controller sequentially, intermittently pulses the LED elements of the LED array. The controller over drives the LED elements of the LED array with a current in excess of several times the continuous forward rating for the individual LED elements. The housing is a substantially closed, waterproof, tubular member and may include a power source in the housing. The light source may form a portable light source. The light source may include a fiber optic bundle coupling in the housing and a fresnel lens between the LED array and the fiber optic bundle coupling.

31 Claims, 3 Drawing Sheets

U.S. PATENT DOCUMENTS

| | | |
|---|---|---|
| 6,331,062 B1 | 12/2001 | Sinclair |
| 6,366,028 B1 | 4/2002 | Werner et al. |
| 6,398,383 B1 | 6/2002 | Huang |
| 6,402,340 B1 | 6/2002 | Sharrah et al. |
| 6,402,347 B1 * | 6/2002 | Maas et al. .................. 362/294 |
| 6,485,160 B1 | 11/2002 | Sommers et al. |
| 6,491,409 B1 * | 12/2002 | Sharrah et al. ............. 362/206 |
| 6,511,203 B1 | 1/2003 | Winther |
| 6,511,214 B1 | 1/2003 | Parsons et al. |
| 6,536,912 B2 | 3/2003 | Parker |
| 2002/0067608 A1 | 6/2002 | Kruse et al. |
| 2002/0109987 A1 * | 8/2002 | Lai ............................ 362/206 |
| 2002/0149930 A1 | 10/2002 | Parker |
| 2002/0196620 A1 | 12/2002 | Sommers et al. |

\* cited by examiner

SOLID STATE LIGHT SOURCE

RELATED APPLICATION

This application claims the benefit of U.S. Pending Application Ser. No. 60/326,802 entitled "Solid State Light Source" Filed Oct. 3, 2001 which is incorporated herein by reference.

BACKGROUND OF THE INVENTION

1. Field of the Invention

The present invention relates to a solid state light source, and more particularly, to a light source using an array of light emitting diodes elements (LED elements) arranged in a sealed housing.

2. Brief Description of the Prior Art

Specialized light sources have been developed in numerous industries. For example, light sources utilizing fiber optic bundles have been used by machine vision engineers for years to put light just where it is needed. Fiber enables the engineer the generate the precise lighting geometries required to perform difficult inspections. Halogen sources have been a mainstay to illuminate these fiber optic bundles. However, the typical halogen source suffers several shortcomings and was not designed for use on the factory floor. The light from a fresh halogen lamp is brilliant; but, output declines steadily over the lamp's relatively short 1000 hour life. In addition, a typical halogen lamp consumes 150 watts of power and generates a tremendous amount of heat. Consequently, the typical source is not a sealed, shock resistant unit because ventilation is required. Due to these design considerations, present product offerings are housed in heavy, bulky enclosures.

In addition to use as a light source for the purpose of illumination, LED elements are also commonly used for information display such as LED element display panels, "power on" indicators and the like. Within the meaning of this application, a light source is a lighting device used for illumination. An LED element used for the purpose of information display will typically be on the order of less than one hundred (<100) milli-candela whereas an LED element used for illumination will typically be on the order of at least one thousand ($\geq 1000$) milli-candela. Consequently, there is a large distinction in the industry between LED based light sources and LED based display devices.

Advances in LED technology have prompted a number of well-known manufacturers in the machine inspection industry to introduce products to eliminate not only the halogen source but the fiber optic bundle as well. Lines, rings, and panels which were once strictly the domain of fiber optics are now being populated with LED elements. Other speciality units such as on-axis and cloudy day illuminators are also available in LED form. At first glance, this appears to be a technically sound, cost-effective illumination alternative. While not as bright, LED technology offers features and capabilities unavailable with halogens. However, the illumination patterns generated from these products are generally poor and uneven because the individual LED elements produce hot spots that randomized fiber optic would have eliminated.

Northeast Robotics, Fostec, Illumination Technologies, & Dolan Jenner are representative of the companies in the machine vision illumination industry. Northeast Robotics is the assignee of U.S. Pat. Nos. 6,177,954; 6,135,350; 6,059,421; 6,003,992; 5,949,584; 5,920,643; 5,877,899; 5,842,060; 5,764,874; 5,761,540; 5,713,661; 5,684,530; 5,604,550; 5,461,417; and 5,187,611. Fostec is the assignee of U.S. Pat. Nos. 5,887,102 and 5,187,765. Illumination Technologies is the assignee of U.S. Pat. Nos. 5,752,767; 5,661,838; 5,591,972; 5,550,946. Dolan Jenner is the assignee of U.S. Pat. Nos. 5,997,164; 5,820,250; 5,790,734; 5,579,177; 5,276,504; RE34,345; 5,229,842; 5,102,227; 4,772,128; and 4,280,122.

There still remains a need in the machine vision industry for a durable, low cost, low power, light source providing effective lighting to the desired location. This need is not limited to the machine vision industry. Durable, low cost, low power, light source providing effective lighting to the desired location would also be particularly well-suited for portable light sources such as flashlights, bicycle lights, helmet lights; hand-held lanterns and the like. Regarding flashlights and the like, Mag Instruments is the assignee of U.S. Pat. Nos. D336,535; D335,718; 5,193,898; 5,184,884; and 5,062,026. The Brinkmann Corp. is the assignee of U.S. Pat. Nos. D445,926; D436,200; D414,887; and D413,401. Ledtronics is the assignee of U.S. Pat. Nos. D434,510; D405,201; D404,506; and D402,772. In a similar fashion, a durable, low cost, low power, light source providing effective lighting to the desired location would also be well-suited for other specific lighting areas such as outdoor lighting, back-up or emergency lighting, interior vehicle lighting and numerous other applications. LED light sources have been proposed in a number of areas, but have not yet adequately addressed all of the lighting criteria. See for example U.S. Pat. No. 6,290,382 (LED vision system); U.S. Pat. No. 6,283,613 (LED traffic light); U.S. Pat. No. 6,276,822 (LED headlight); U.S. Pat. No. 6,268,702 (LED warning light); U.S. Pat. No. 6,234,645 (LED white light); U.S. Pat. No. 6,220,722 (LED white light for aeroplane cabin); U.S. Pat. No. 6,220,719 (LED flashlight); U.S. Pat. No. 6,168,288 (LED flashlight); U.S. Pat. No. 6,095,661 (LED flashlight); U.S. Pat. No. 6,639,716 (LED light); U.S. Pat. No. 6,028,694 (LED light); U.S. Pat. No. 5,897,195 (LED light); U.S. Pat. No. 5,850,126 (LED light); U.S. Pat. No. 5,634,711 (LED light); U.S. Pat. No. 4,234,911 (LED flashlight); U.S. Pat. No. 4,211,955 (LED light).

It is an object of the present invention to provide a durable, low cost, low power, light source providing effective lighting to the desired location for a variety of specific applications. It is another object of the present invention to provide such durable, low cost, low power, light source providing effective lighting to the desired location effective for the machine vision illumination and usable as a fiber optic bundle lighting source. It is another object of the present invention to provide a light source that is economically manufactured and easily usable with a variety of applications.

SUMMARY OF THE INVENTION

The above objects are achieved with a light source according to the present invention. A light source includes a housing, an LED array of individual LED elements mounted in the housing, and a controller mounted in the housing and coupled to the LED array. The controller may sequentially, intermittently pulse the LED elements of the LED array. The controller may over drive the LED elements of the LED array with a current in excess of several times the continuous forward rating for the individual LED elements. The housing may be a substantially closed, waterproof, tubular member and may include a power source in the housing.

In one embodiment of the present invention, the light source may form a portable light source, such as a flashlight, bicycle light, helmet light or the like. The light source may include at least one battery forming the power source in the housing and the housing may be formed as a substantially closed, waterproof, tubular member forming the portable light source.

In another embodiment of the present invention the light source may be of the type used in the machine vision area and include a fiber optic bundle coupling in the housing. The light source may include a fresnel lens in the housing between the LED array and the fiber optic bundle coupling. The light source may further include a collector mirror between the lens and the fiber optic bundle coupling. The housing may have a power source coupling. The light source may further include an intensity adjustment mechanism in the housing for adjusting the intensity of the LED array.

The light source according to the present invention may include a plurality of colors of LED elements in the LED array. The light source may have the LED array divided into channels of LED element pairs operated simultaneously. The light source may use 5 mm LED elements in the LED array, although other sizes and styles of LED elements, such as surfaces mounted chips, may be utilized depending on the desired application. The light source may provide the controller to evaluate the power source and control the LED array accordingly, thereby accepting a variety of input voltages. The controller may accept external strobe signals.

These and other advantages of the present invention will be clarified in the description of the preferred embodiments taken together with the attached drawings in which like reference numerals represent like elements throughout.

DETAILED DESCRIPTION OF THE PREFERRED EMBODIMENTS

Figure 1:
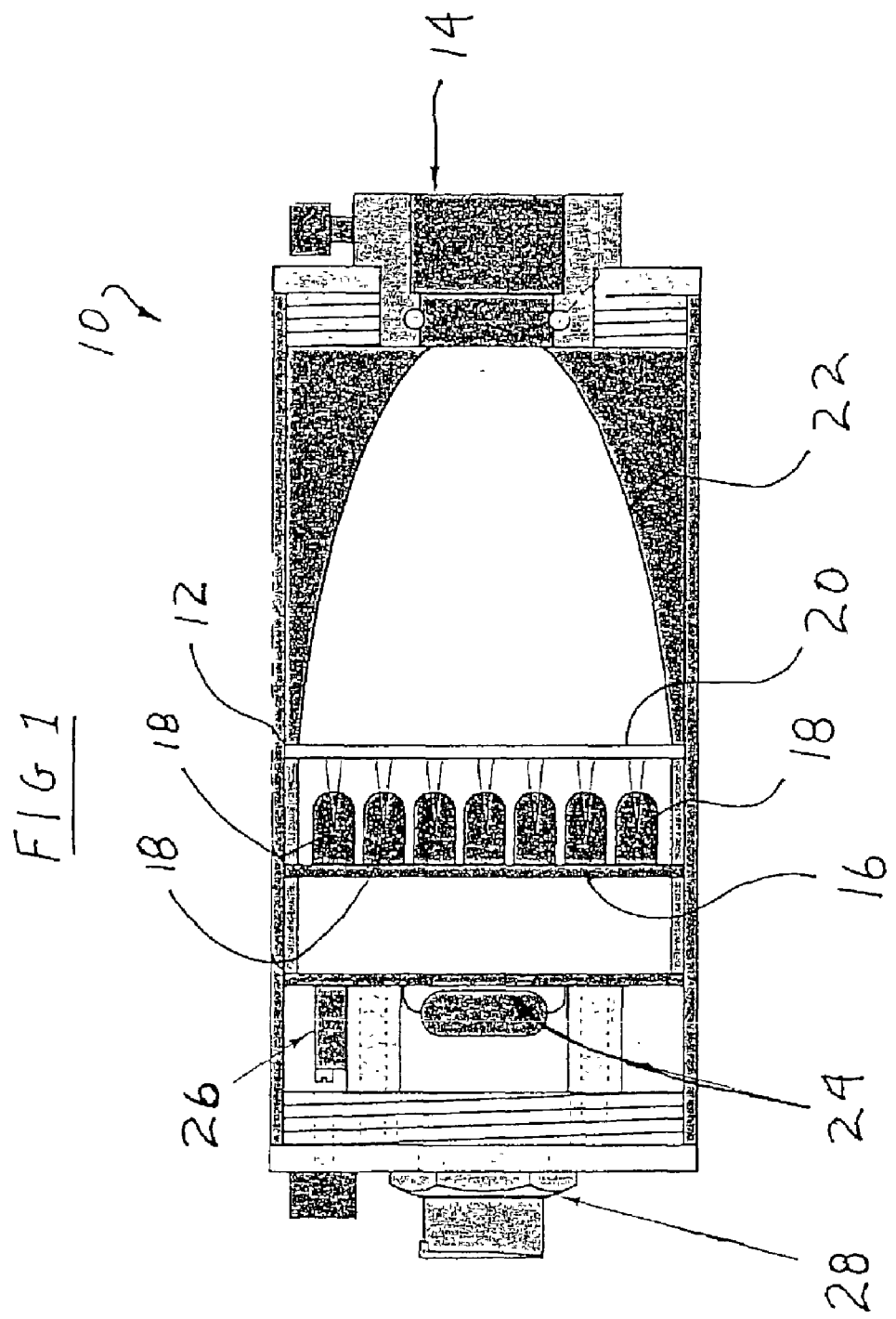
FIG. 1 is a schematic sectional side view of a light source according to one embodiment of the present invention.
Figure 2:
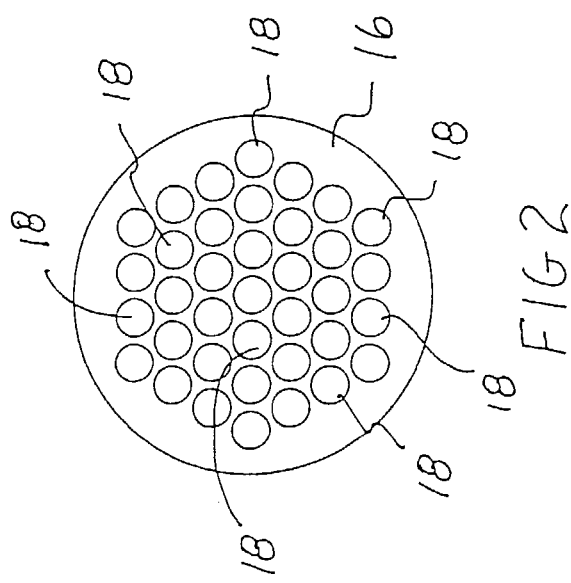
FIG. 2 is a plan view of an LED array of the light source shown in FIG. 1.

One embodiment of the present invention is shown in FIGS. 1–2. As shown in FIG. 1, the present invention is a light source 10 for illuminating a fiber optic bundle (not shown) such as used in machine vision illumination. The light source 10 includes a rigid, substantially closed housing 12 formed of an anodized aluminum tube with threaded end caps. Other materials, such as plastic or steel, may also be used to form the housing 12. One end of the housing 12 includes a conventional fiber optic bundle coupling 14 for receipt of an end of a fiber optic bundle in a conventional manner. The housing 12 can easily accommodate different couplings 14 simply by replacing the end cap and coupling 14. This construction allows the light source 10 to be used with a variety of fiber optical bundles.

The light source 10 includes an LED array 16 formed of a plurality of individual LED elements 18 as shown in FIG. 2. The LED elements may be of a variety of colors. Preferably, the LED elements 18 are 5 mm elements, since these effectively balance the light emitted or brightness with the population density, size and cost. However, any size or style LED element 18 may be used based upon the desired use of the light source 10. For example, chip style surface mount elements may also be utilised in certain applications. The LED elements 18 may be grouped into pairs on the LED array 16. LED elements 18 are available in many sizes and colors. In addition, the 5 mm LED elements 18 (and other sized LED elements 18) are available in many emitting wavelengths. This is important because the LED array 16 may be populated with LED elements 18 of any color or wavelength. A single LED array 16 may, in fact, be populated with LED elements 18 emitting different wavelengths for the purpose of switching or mixing colors to achieve a desired result. Typical colors and their associated wavelengths include Red (635 nm), Amber (620 nm), Yellow (590 nm), Green (525 nm), Blue (470 nm), White (420–700 nm) and Infrared (880 nm). The actual construction of the LED array is believed to be known to those in the art.

A fresnel lens 20 is positioned adjacent the LED array 16 to assist in focusing the light from the LED array 16 onto the fiber optic bundle in the coupling 14. A chrome plated brass mirror 22 is positioned between the lens 20 and the coupling 14 to further assist in the transmission of the maximum amount of uniform light to the fiber optic bundle in the coupling 14. Optical components positioned in front of the LED array 16 are used to enhance the luminous efficiency of the light source 10 by gathering and directing light emitted from the LED array 16 to the end of the optical fiber bundle. Specifically, the Fresnel lens 20 is used to focus the parallel rays onto the bundle. The end of the bundle is positioned inside the focal point of the lens 20 since a sharp focus is not desirable. A soft focus bathes the entire bundle in a circle of light. In addition the elliptical mirror 22 is employed to gather oblique rays and direct them to the fiber bundle.

A controller 24, shown schematically in FIG. 1, is positioned in the housing 12 and coupled to the LED array 16 for controlling the individual LED elements 18. It is preferred if the controller 24 operates the LED array 16 such that each pair of LED elements 18 is pulsed in a sequence similar to the firing order of an internal combustion engine. Rapid pulsing of the LED elements 18 will further maximize light output by driving the LED elements 18 with current several times in excess of the manufacturer's continuous forward rating. The LED elements 18 are allowed to cool during the rest portion of the cycle to prevent damage. The net effect is a brighter light with lower energy consumption than if the LED array 16 was powered in a continuous current mode. The specific amount of the over driving of the individual LED elements can be determined based upon the given application; however, at least three (3) times the continuous forward rating is expected and six (6) to eight (8) times the given rating (or even more) is contemplated. The construction of the control board or controller is only shown schematically and is believed to be known to those in the art. Any number of specific control circuit boards may be designed to accomplish the desired functionality, including the pulsing and over driving discussed above, strobing of the LED array 16, color mixing or other control functions. The controller 24 located behind the LED array 16 serves multiple roles. First, it regulates the power to the LED array 16. Power is normally provided by an external 5 VDC wall mount supply. However, the control board or controller 24 is capable of accepting a wide range of input voltages. The controller 24 will evaluate the power source supplied and control the LED array 16 accordingly to provide a constant light output with a range of voltage power inputs. This permits, within a reasonable range, the use of whatever power is available. The light source 10 can even be battery powered if necessary. Another part of its circuitry controls the pulsing function of the LED array 16 and accepts an external strobe signal. The controller 24, or control board, also controls the intensity of the LED array 16. A multi-turn potentiometer 26 is coupled to the controller 24 and is accessible through the rear end cap and allows manual adjustment of LED array 16 brightness. The design of the specific controller 24, as with the LED array 16, will depend on the specific application of the light source 10.

The housing 12 includes a power coupling 28 for connection to an external power source (not shown) through a power cord (not shown). As discussed above, the light source 10 may be used with a battery source as well, with the battery source coupled to the housing 12 through the power coupling 28. The battery source may, alternatively, be positioned within the housing 12.

The present invention relates to the generation of light (e.g., illumination) whereby the emitting LED elements 18, control circuitry in the controller 24, and associated optical components are housed within a rugged, sealed tube forming the housing 12. This embodiment of the invention is somewhat similar to or summarized as a light in a pipe. The structural shape of the housing 12 permits the easy alignment of key components along an optical axis while simultaneously providing the protective easily protected and sealed housing 12 necessary for the survival of those components in a hostile or adverse environment. It has been designed to provide illumination in situations that require a compact, lightweight source; extreme durability; long, reliable emitting life; low power consumption; minimal heat generation; and special illumination controls (e.g., intensity, color mixing, strobing).

As machine vision engineers, the inventors, Mr. Donald V. Pritchard and Mr. William J. Magiske, have developed a new light source 10 that combines LED technology with the benefits of fiber to provide superior illumination in a very rugged, compact package. The light source 10 generates light from the LED array 16. The light is then collected and focused onto the end of a fiber bundle. All components are housed in a small tube forming the housing 12 that can be mounted in any orientation. Low power consumption of the LED array 16 means that no cooling is required. The housing 12 is sealed and water-resistant. The use of LED elements 18 makes the light source 10 shock resistant because there are no filaments or moving parts that can fail. In fact, the LED array 16 has a rated life of 100,000 hours. The LED elements 18 are available in a variety of wavelengths including infrared. The light source 10 can accommodate a fiber bundle from any manufacturer by changing the coupling 14 on the front of the housing 12. Another benefit of the light source 10 is that it can be strobed, eliminating the need for expensive strobing units that will degrade over time. In summary, the effort has been to develop a rugged light source 10 that combines the functionality of both traditional halogens and gas discharge strobes for the illumination of fiber without the associated drawbacks.

The light source 10 uses rigid tubing as its housing 12 as discussed above. This simple structural shape was chosen for several reasons. Housing 12 is produced with minimal machining and at very little cost. The tube itself is rugged. A tube permits the easy alignment of key components along an optical axis while simultaneously providing a protective housing 12. Assembly is quick and easy because all electrical and optical components are slipped into the tube. Proper internal component separation may be easily maintained with spacer tubes. Screw on end caps seal the housing 12. Power is provided through a waterproof connector or power coupling 28 on the rear end cap. An external strobe trigger signal can also be applied through this coupling 28. The light source 10 accommodates fiber optic bundles from different manufacturers by attaching the appropriate coupler 14 to the front end cap of the housing 12.

Engineers have always been forced to choose between a continuous light source such as a halogen or a gas discharge strobe to illuminate the optical fiber used in machine vision inspection systems. The light source 10 functions as both. No other product fulfills this dual role. The light source 10 has been designed to be versatile, rugged, and energy efficient. The light source 10 uses the LED array 16 to illuminate optical fiber. No existing product on the market known to the inventors does this. Other LED products are used in lieu of optical fiber and can produce uneven illumination patterns as a result. The light source 10 can illuminate optical fiber in either continuous or strobed modes. Typically, a halogen source is purchased for continuous illumination of fiber or a gas discharge strobe for pulsed illumination. No known existing product on the market does both. The light source 10 can be provided with an LED array 16 which emits light in a variety of colors including infrared and ultraviolet. Other light sources must employ a filter to absorb unwanted colors. The light source 10 produces a cool light. It consumes only 4 watts of power. In contrast, halogen sources generate a tremendous amount of heat while consuming 150 watts. The LED elements 18 used in the LED array 16 have a rated life of 100,000 hours. In contrast, halogen bulbs typically last for 1000 hours. Gas discharge flash tubes have a life of 6 million cycles. The light output of the LED array 16 is constant throughout is rated life. The output from halogens and flash tubes degrades over the life of the bulb. The light source 10 uses the Fresnel lens 20 and elliptic mirror 22 in tandem to focus and direct light from the array to the fiber bundle. Other products do not employ similar components. The light source 10 is compact, rugged, and highly water-resistant. The typical halogen or strobe source must be housed in bulky, expensive enclosures to survive in rigorous factory environments. The light source 10 will operate on a wide range of input voltages. Other sources typically require a very specific input voltage such as 120 VAC or 24 VDC.

The ramifications of the present technology extend beyond the machine vision market. Specifically, the overall design concept lends itself to performance enhancements in products for outdoor, safety, emergency, and portable illumination applications. These include flashlights, headlamps, lanterns, etc. At present, these products typically employ tungsten, krypton, xenon, and halogen bulbs. The glowing filaments in these bulbs consume a significant amount of power and also generate considerable heat. Battery life with these products is measured in hours. In addition, filaments are somewhat fragile and will break with sufficient shock.

While originally developed as an illumination source for the optical fiber used in industrial machine vision systems, the present invention lends itself very nicely to illumination issues within a number of very diverse markets. Where one or more of the aforementioned parameters is of paramount importance, the invention is an appropriate and preferred solution. The concept and overall design have application for portable, safety, marine, emergency, and outdoor lighting. Variations of the invention for these applications include flashlights for emergency and military personnel as well as general purpose use; headlamps for miners, construction workers, spelunkers, and cyclists; bicycle lighting for mountain bikers and cycle mounted police; lanterns for campers, boaters, and homeowners; cockpit lighting for boats and pleasure craft; and solar powered safety and decorative outdoor lighting.

Figure 4:
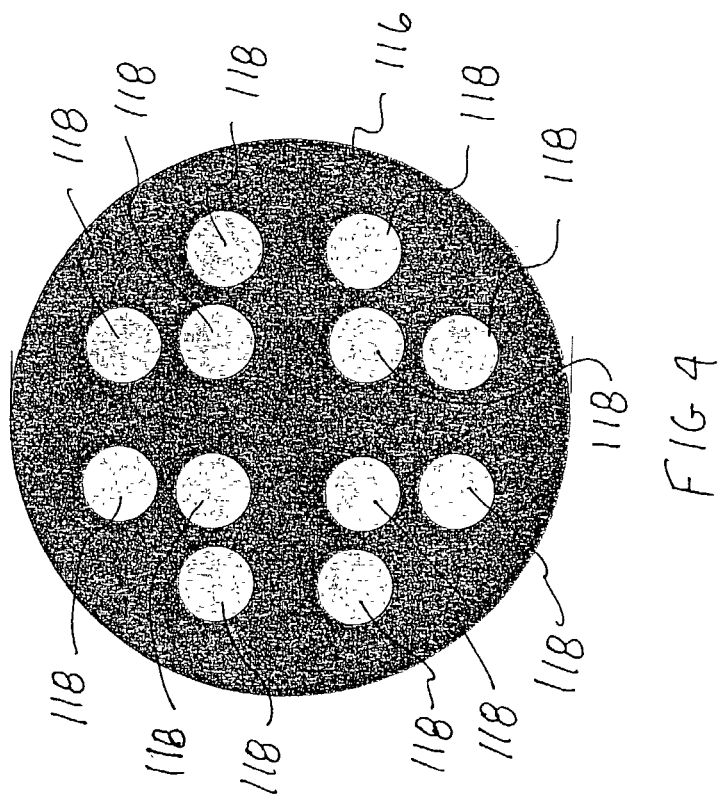
FIG. 4 a plan view of an LED array of the light source shown in FIG. 1.
Figure 3:
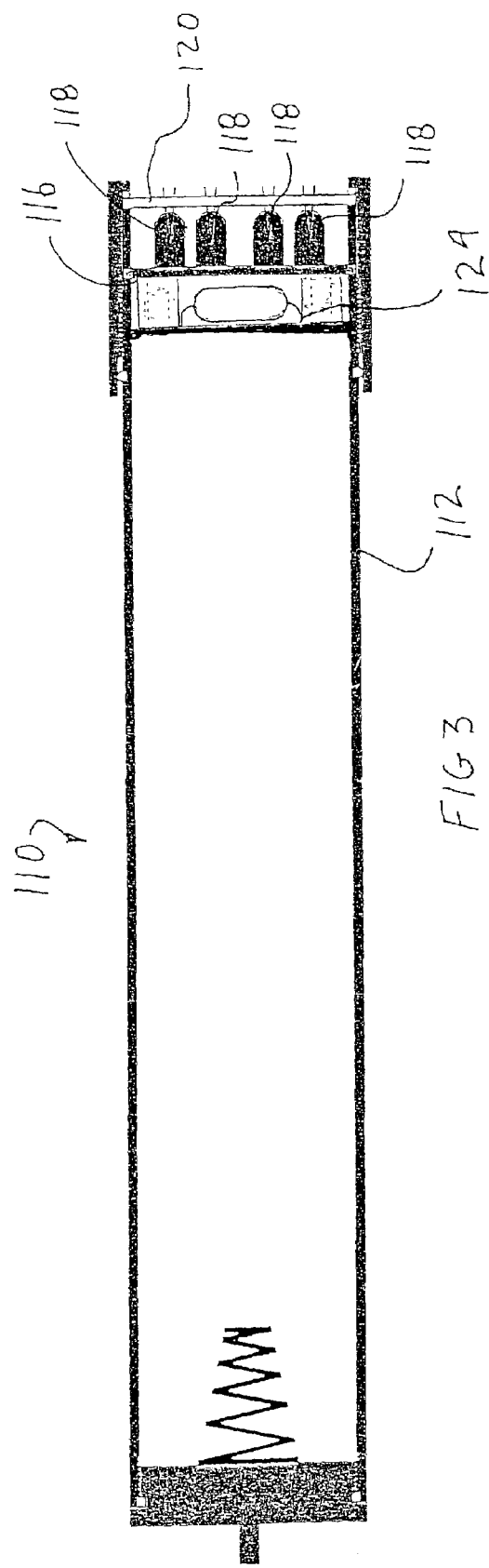
FIG. 3 is a schematic sectional side view of a light source according to a second embodiment of the present invention.

FIGS. 3–4 illustrate the formation of a light source 110 according to another embodiment of the present invention, specifically in the form of a portable flashlight. The light source 110 is similar to light source 10 including a housing 112 and an LED array 116 of LED elements 118 with controller 124 in the housing 112. A window 120 replaces the lens 20 to seal the housing 112. The housing 112 differs from the housing 12 by providing for the receipt of one or more batteries therein as the power source. Appropriate switching (not shown) will be provided in the housing 112 as is known in the flashlight art.

The light source 110 provides several advantages over existing flashlights. The light source 110 uses the LED array 116 to generate a substantial amount of light, particularly through the pulsing and over driving of the LED elements 118. In contrast, most existing flashlights use tungsten or krypton bulbs. Existing LED flashlights are available, but do not pulse or over drive the LED elements to provide acceptable light emission. The LED array 116 generates very even illumination patterns with no special optical components. Traditional flashlights use a parabolic reflector to collect and direct the light. Reflectors can create interference patterns of concentric rings of light that can be very annoying to the users. Even premium flashlights from manufacturers, such as Mag Instruments, suffer this problem. The use of the LED elements 118 consume far less power than traditional flashlight bulbs of similar output. This translates into exceptional battery life. The light source 110 pulses the LED array 116 to maximize light output while extending battery life. For example the light source 110 with a 12 LED element array 116, as shown in FIG. 4, can generate useful light non-stop for two weeks on 3 D cell batteries. No existing commercial flashlight on the market can match this performance. Since the LED array 116 is comprised of several pulsed channels, it can be provided in dual or even multiple colors. This has ramifications for military applications. The soldier in the field uses screw on filters to get the color he needs in conventional flashlights. The light source 110 can obviate this through colored LED elements 118. No known flashlight on the market currently provides this feature. The light source 110 is designed to operate over a wide range of voltages. This allows the user to utilize whatever batteries are available. No commercial flashlight on the market is believed to have this capability. The typical LED element 18 or 118 has a rated life of 100,000 hours and is extremely shock-resistant. In contrast, the typical flashlight bulb has a life of a few hours and is easily damaged.

The present invention is also particularly well-suited for use as headlamps or helmet lights. The headlamp can be formed similar to light source 110 above or have a remote power source coupled through a power coupling as in light source 10 above. The remote power source may be a battery clipped to the user, such as to the user's belt. Headlamps which use an LED array 16 or 116 according to the invention will generate a substantial amount of light with relatively low power consumption. In contrast, manufacturers of headlamps for the mining and construction industries use high intensity bulbs that consume a significant amount of power. Headlamps using LED arrays 16 or 116 consume far less power than traditional units and will extend battery life over traditional units. Headlamps according to the present invention will operate for days on a single charge. Traditional units have a 10 to 14 hour run time and must be recharged daily. No headlamps on the market can match the performance of the present invention. Further, low power consumption also translates into smaller, lighter battery packs. The typical miner's headlamp weighs about 4 pounds. The battery pack weighs an additional 4 to 5 pounds and hangs from the belt like a large brick. Headlamps according to the present invention operate with small, light weight batteries minimizing these issues. The LED arrays 16 and 116 generate very even illumination patterns with no optical components. Traditional headlamps use a parabolic reflector to collect and direct the light. As discussed above, the light source of the present invention is designed to operate over a wide range of voltages. This permits the use of whatever batteries are available. No headlamp on the market does this. Further, the typical LED element 18 or 118 has a rated life of 100,000 hours and is extremely shock-resistant. In contrast, the typical headlamp bulb has a life of a few hundred hours and is easily damaged.

The present invention is also particularly well-suited for the formation of lanterns for all of the reasons discussed above. These LED lanterns would be designed for camping, backyard, and marine activities. Further, it has been noticed that the cool light from the LED array does not attract bugs. Finally, the bluish white light from the LED array 16 or 116 tends to fluoresce fishing line making it easier for night time fishermen to thread their lures. It also provides the right amount of light in the boat cockpit without harming night vision.

Another application of the present invention is in bicycle lights. They incorporate the aforementioned characteristics of superior illumination, long battery life, and ruggedness. Further, the light from the LED array 16 or 116 will cast fewer shadows, especially in wooded areas, giving the rider better three dimensional recognition capabilities. The light weight of both the light source 10 or 100 and batteries are beneficial to weight conscious cyclists. Finally, police cyclists can also rely on the light's ability to change colors and strobe, giving the cyclist headlight, safety, and warning light capability from one unit.

In summary, the present invention is not limited to high intensity white LED elements 18 that are driven with special circuitry in conjunction with optical components to gather and direct the emitted light into a fiber bundle. The proposed outdoor, safety, and portable illumination product designs (flashlights, headlamps, and lanterns) are subsets of the original solid state fiber optic light source 10. They retain the same circular LED arrays 16 and 116, drive circuitry in the controller 24 and 124, and rigid housings 12 and 112. The optical components 20 and 22 used in the fiber optic light source 10 are traded for sealed windows 120 in the light source 110. The various embodiments of the present invention generally share the same cylindrical housing shape, use LED arrays, share the same electronic circuitry to pulse the array, and accept a wide range of input voltages.

It will be apparent to those of ordinary skill in the art that various modifications may be made to the present invention without departing from the spirit and scope thereof. The scone of the present invention is defined by the appended claims and equivalents thereto.

We claim:

1. An illumination light source comprising:
   a housing formed of a tube with a pair end caps removably attached at opposed ends of the tube;
   an LED light member having at least one individual LED element mounted in the housing, wherein each individual LED element is at least 1-candela;
   a replaceable fiber optic bundle coupling removably mounted directly onto one end cap of the housing with the fiber optic bundle coupling adapted to removably receive the end of a fiber optic bundle therein, wherein the replaceable fiber optic bundle coupling is separate from the end cap; and a mechanism within the housing between the LED light member and the fiber optic bundle coupling for concentrating light from the LED light member onto the fiber optic bundle coupling.

2. A light source comprising:

a housing;

an LED light member mounted in the housing, wherein the LED light member is an array of individual LED elements;

a fiber optic bundle coupling mounted in the housing; and a controller intermittently pulsing the LED elements of the LED array, and wherein the controller sequentially pulses the LED elements and over drives the LED elements of the LED array with a current in excess of the continuous forward rating for the individual LED elements.

3. The light source as claimed in claim 2 wherein controller over drives the LED elements of the LED array with a current in excess of three times the continuous forward rating for the individual LED elements.

4. The light source as claimed in claim 1 wherein the housing is a substantially closed, waterproof, tubular member with the end caps threaded to an aluminum tube, and the fiber optic bundle coupling threaded onto one end cap.

5. The light source as claimed in claim 1 further including a power source in the housing.

6. The light source as claimed in claim 5 wherein the power source includes at least one battery and the housing is a substantially closed, waterproof, aluminum tubular member with threaded end caps forming a portable light source, and wherein the fiber optic bundle coupling is threaded onto one end cap.

7. The light source as claimed in claim 1 wherein the housing is a substantially closed anodized aluminum tubular member with threaded end caps, and wherein the fiber optic bundle coupling is threaded onto one end cap.

8. The light source as claimed in claim 7 wherein the mechanism for concentrating light from the LED light member includes a fresnel lens in the housing between the LED light member and the fiber optic bundle coupling.

9. The light source as claimed in claim 8 wherein the mechanism for concentrating light from the LED light member further includes a collector mirror between the lens and the fiber optic bundle coupling.

10. The light source as claimed in claim 9 wherein the housing is a substantially closed, waterproof, anodized aluminum tubular member having a power source coupling threaded onto one end thereof.

11. The light source as claimed in claim 9 further including an adjustment mechanism in the housing for adjusting the intensity of the LED light member.

12. The light source as claimed in claim 1 wherein the LED light member includes a plurality of colors of LED elements.

13. The light source as claimed in claim 1 wherein the LED light member is divided into channels of LED element pairs operated simultaneously.

14. The light source as claimed in claim 1 wherein the LED light member is formed as an array that uses one of 5 mm LED elements and chip style surface mount elements.

15. The light source as claimed in claim 1 further including a controller intermittently pulsing the LED elements of the LED light member, and wherein the controller accepts a variety of input voltages and accepts external strobe signals.

16. An illuminating fiber optic light source comprising:

a light-weight housing formed of an aluminum tube with a pair of threaded end caps removably attached to opposed ends of the tube;

an LED light member including at least one LED element mounted in the tube of the housing, wherein each LED element is at least 1 candela;

a lens mounted in the housing adjacent the LED light member; and a replaceable fiber optic bundle coupling threaded directly in one end cap of the housing, wherein the fiber optic bundle coupling is configured to removably receive the end of a fiber optic bundle therein, wherein the replaceable fiber optic bundle coupling is separate from the end cap; and a mechanism within the housing between the LED light member and the fiber optic bundle coupling for concentrating light from the LED light member onto the fiber optic bundle coupling.

17. The light source as claimed in claim 16 wherein the mechanism for concentrating light from the LED light member includes a collector mirror between the lens and the fiber optic bundle coupling.

18. The light source as claimed in claim 16 wherein the housing is a substantially closed, waterproof, tubular member having a power source coupling.

19. The light source as claimed in claim 16 further including an adjustment mechanism in the housing for adjusting the intensity of the LED light member.

20. The light source as claimed in claim 16 wherein the LED light member is divided into channels of LED element pairs operated simultaneously.

21. A portable LED light source comprising:

a ridged, substantially closed housing formed of an aluminum tube with opposed threaded end caps;

a LED light member formed of at least one individual LED element mounted in the housing; and a power source coupled to the LED light member;

a replaceable fiber optic bundle coupling threaded directly in one end cap of the housing, wherein the fiber optic bundle coupling is configured to removably receive the end of a fiber optic bundle therein, wherein the replaceable fiber optic bundle coupling is separate from the end cap;

a mechanism within the housing between the LED light member and the fiber optic bundle coupling for concentrating light from the LED light member onto the fiber optic bundle coupling and a controller mounted in the housing and coupled to the LED light member, wherein the controller evaluates the power source and controls the LED light member providing a light source output that is substantially constant over a range of input voltages from the power source, and wherein the controller over drives the LED elements of the LED light member with a current in excess of the continuous forward rating for the individual LED elements.

22. The light source as claimed in claim 21 wherein the LED light member uses 5 mm LED elements and wherein the controller accepts external strobe signals.

23. The light source as claimed in claim 21 wherein the controller sequentially, intermittently pulses the LED elements of the LED light member.

24. The light source as claimed in claim 21 wherein the light source is a machine vision light source and the housing is a substantially waterproof member.

25. The light source as claimed in claim 21 wherein the power source is in the housing.

26. The light source as claimed in claim 25 wherein the power source includes at least one battery and the housing is a substantially closed, waterproof, tubular member forming a portable light source.

27. The light source as claimed in claim 21 wherein the mechanism for concentrating light from the LED light member includes a fresnel lens in the housing between the LED light member and the fiber optic bundle coupling.

28. The light source as claimed in claim 27 wherein the mechanism for concentrating light from the LED light member further includes a collector mirror between the lens and the fiber optic bundle coupling.

29. The light source as claimed in claim 28 further including an adjustment mechanism in the housing for adjusting the intensity of the LED light member.

30. The light source as claimed in claim 21 wherein the LED light member includes a plurality of colors of LED elements.

31. The light source as claimed in claim 21 wherein the LED light member is divided into channels of LED element pairs operated simultaneously.

* * * * *